March 14, 1961 J. G. HAWLEY 2,974,493
DISPLACEMENT SAVER
Filed Aug. 13, 1959

INVENTOR.
JESSE G. HAWLEY
BY
*J. B. Holden*
ATTORNEY

United States Patent Office 2,974,493
Patented Mar. 14, 1961

2,974,493

DISPLACEMENT SAVER

Jesse G. Hawley, Penn Yan, N.Y., assignor to The Goodyear Tire & Rubber Company, Akron, Ohio, a corporation of Ohio Filed Aug. 13, 1959, Ser. No. 833,527

4 Claims. (Cl. 60—54.5)

This invention relates to displacement savers for hydraulic brake systems, and the like, and functioning to convert initially small volume high pressure braking fluid as produced by a master cylinder to low pressure high volume fluid pressure to take up the slack in a brake system followed by return to small volume high pressure for braking action.

It has been proposed heretofore to utilize between a hydraulic brake and a master cylinder a displacement saver for quickly taking up the slack or play due to wear and other causes in a hydraulic brake by means of comparatively large volume and low pressure fluid, followed by the application of small volume and high pressure fluid to effect the actual braking force. However, known displacement savers are open to the objection that while they may operate in theory they seldom prove satisfactory in practice. Moreover, they are apt to take the form of relatively complicated and expensive valve and piston arrangements which tend to fail in service and/or present high maintenance costs.

It is the general object of the invention to avoid and overcome the foregoing and other difficulties of and objections to known displacement savers by the provision of a relatively simple, inexpensive, long-lived displacement saver for hydraulic brake systems and the like and characterized by smoothness and efficiency of operation over long periods of time with substantially little or no maintenance.

The foregoing objects of the invention, and other objects which will become apparent as the description proceeds, are achieved by the provision in a displacement saver for use in a hydraulic brake system, or the like, of an input conduit, an output conduit, different diameter piston means connected between the conduits for converting high pressure small volume fluid input to large volume small pressure output, a normally open valve at the output side of the piston means, a bypass between the conduits, a normally closed valve in the bypass, and means responsive to pressure input for closing the normally open valve and opening the normally closed valve to apply high pressure fluid from the input conduit to the output conduit after the slack or play in the brake system has been taken up by the large volume small pressure output of the different diameter piston means.

Figure 1:
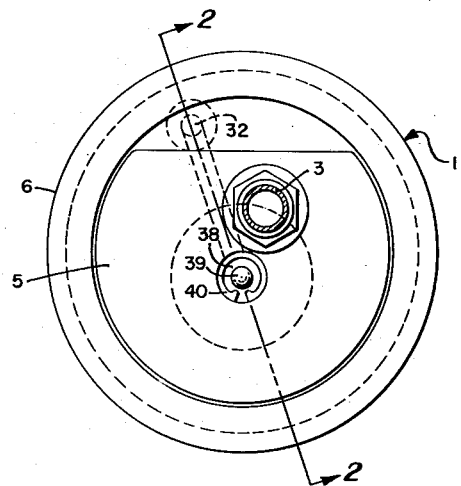
Figure 2:
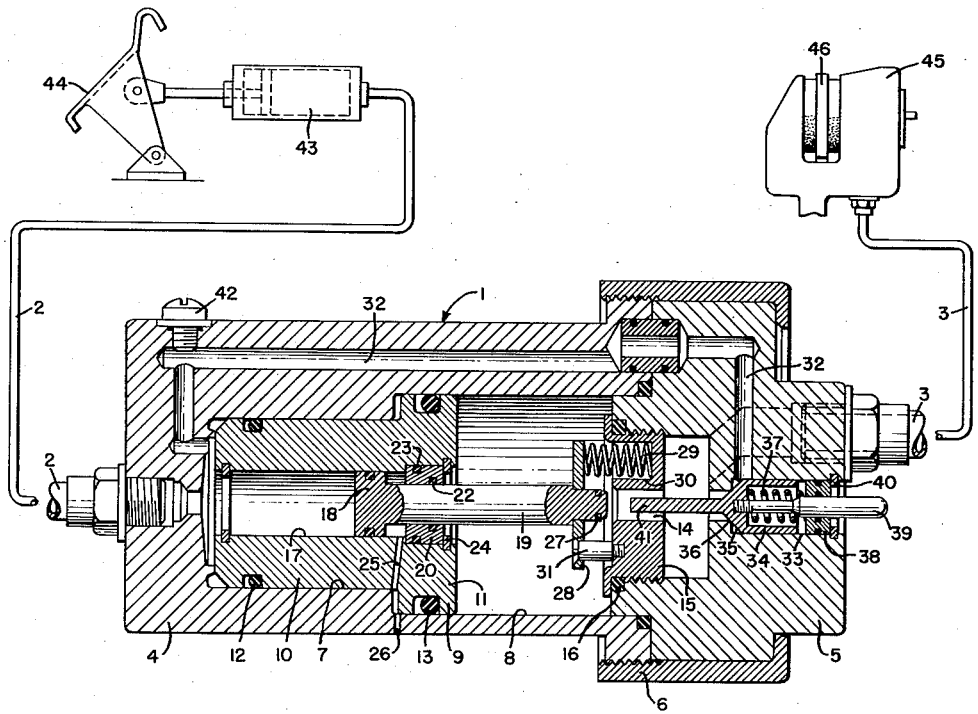

For a better understanding of the invention reference should be had to the drawings in which:

Fig. 1 is an end view of a typical embodiment of the displacement saver of the invention; and Fig. 2 is a longitudinal and diametrical sectional view of the displacement saver taken on line 2—2 of Fig. 1.

In the drawings, the numeral 1 indicates generally a housing having an input conduit 2 secured at one end and an output conduit 3 secured to the other end, the conduit 2 being secured to a small volume high pressure fluid source, such as a master cylinder 43, and the conduit 3 being adapted to extend to a hydraulic brake 45. The housing 1 is actually made up from two separate parts 4 and 5 joined together by a cup-shaped nut 6.

The housing part 4 is formed with a double diameter bore, the smaller diameter being indicated by the numeral 7 and the larger diameter by the numeral 8. The bores 7 and 8 slidably receive a double diameter piston indicated as a whole by the numeral 9 and having a small diameter piston 10 received in the bore 7 and a larger diameter piston 11 received in the bore 8. Suitable sealing means, such as an O-ring 12, seal between the small diameter piston 10 and the bore 7, and sealing means, such as an O-ring 13, slidably seals between the piston 11 and the bore 8. The conduit 2 is connected to apply small volume high pressure fluid to the input or back side of the piston 10 of small diameter to move the large diameter piston 11 to the right in Fig. 2 to discharge large volume small pressure fluid from a port 14 in a closure plug 15 closing off the conduit 3 from the bore 8, the plug 15 being carried in the housing part 5 and being appropriately sealed by an O-ring 16.

The piston 9 of double diameter is itself provided with a bore 17 which slidably receives a control piston 18 having a piston rod 19 extending in alignment with the port 14. The piston rod 19 is slidably sealed in relation to the large diameter piston 11 by means of a collar 20 carrying an O-ring 22 sealing against the piston rod 19 and an O-ring 23 sealing against the piston 11, the collar 20 being held in place by a lock ring 24. A port 25 connects the space between the control piston 18 and the collar 20 to the back side of piston 11 which in turn is connected to the atmosphere by a port 26.

The end of the piston rod 19 remote from the control piston 18 is formed of a reduced diameter and carries sealing means 27 adapted to have close sliding and sealing fit with the port 14 upon movement to the right of the piston rod 19, in the manner hereinafter described. The reduced diameter end of the piston rod 19 remote from the control piston 18 likewise provides a shoulder against which a washer 28 abuts, and with a plurality of circumferentially spaced springs 29, for example three, being positioned between the washer 28 and suitable spring receiving recesses 30 in the closure plug 15. The springs 29 resiliently hold the end of the piston rod 19 out of the port 14, leaving the port normally open, but with the springs adapted to yield under the action of the control piston 18 when the pressure behind, i.e. to the left of the control piston 18 builds up in the operation of the apparatus, as hereinafter described. Displacement of the plate or washer 28 is prevented by the provision of a plurality, such as three, of headed screws 31 spaced circumferentially around the washer 28 between the springs 29, and extending slidably through the washer 28 and tapped into the plug 15 in the manner illustrated.

A bypass passage 32 is provided in both housing parts 4 and 5, the passage 32 connecting to the input conduit 2 behind the small diameter piston 10 and connecting to the output conduit 3 by way of an axial bore 33 in the housing part 5. But positioned in the axial bore 33 is a normally closed valve including a cup 34 having a beveled shoulder 35 engaging with a valve seat 36, the beveled shoulder 35 being normally held in engagement with the valve seat 36 by means of a compression spring 37 positioned in the cup and engaging between the bottom of the cup and a collar 38 which seals both with the bore 33 and with a pin 39 extending slidably through the collar 38 and secured to the bottom of the cup member 34. A snap ring 40 holds the collar 38 in the position illustrated. The cup member 34 is formed with an integral extension 41 extending into the port 14 in a position to be engaged by the end of the piston rod 19 when it seals off the port 14. Such engagement moves the beveled shoulder 35 off of valve seat 36 to open bypass 32 to discharge conduit 3. A removable screw plug 42 allows the air to be bled from the displacement saver when it is filled with fluid and placed in operation.

Completing the assembly of the brake system, conduit 2 extends to the master cylinder 43 operated by a brake pedal 44 under the control of an operator. Conduit 3 extends to the hydraulic pressure brake unit 45 adapted to clamp on a brake disc 46 splined to a wheel not shown.

In the operation of the apparatus of the invention the pilot or operator pressing upon brake pedal 44 operates master cylinder 43 to supply relatively small volume fluid capable of being under relatively high pressure to conduit 2 and thus to the back side or left of the small piston 10. The combined double diameter pistons 10 and 11 then move to the right to force fluid from in front of the large piston 11 out through the port 14 and through the conduit 3 to the brake 45. The relationship between the areas of the small diameter piston 10 and the large diameter piston 11 is usually about on the order of 1 to 2 so that the large piston 11 forces a relatively large volume of fluid, usually about twice as much fluid out of the conduit 3 as the fluid passed into the conduit 2 to effect the movement of the pistons 10 and 11 to the right. Thus, the slack or play in the brake 45, normally called displacement, and occasioned by wear of the friction pads in the brake, for example, is relatively rapidly taken up with a comparatively large volume of fluid at low pressure.

During the movement of the combined pistons 10 and 11 to the right as just described the control piston 18 stays stationary until such time as all of the slack has been taken up in the brake system whereupon the pressure begins to build up behind the small piston 10. Once this build-up of pressure is sufficiently great to overcome the resistance of springs 29 and the difference in diameter between the head of control piston 18 and the pressure acting over the end of the piston rod 19, the control piston 18 and piston rod 19 move to the right, springs 29 yielding to permit this, and washer 28 sliding over screws 31, so that the end of the piston rod 19 moves into the port 14 to close the port.

Simultaneously with the movement of the piston rod 19 into the port 14 to close this normally open port, the end of the piston rod 19 strikes the projection 41 to move the beveled surface 35 off of the valve seat 36 to thereby open this normally closed valve in bypass passage 32 to allow the flow of high pressure fluid from the conduit 2 through the bypass 32 and out of the conduit 3 to the brake 45. Accordingly, large volume low pressure fluid is used to take up the displacement of the brake system, followed by the application of small volume high pressure fluid to effect a strong positive braking operation.

Upon the release of braking pressure as applied by the foot pedal 44 the return springs in the brake pedal 44, and/or master cylinder 43, and/or brake 45, cause a sharp falling away of the pressure behind the small piston 10 and behind the control piston 18, springs 29 effect the movement of the piston rod 19 out of the port 14, spring 37 re-seats the beveled surface 35 on the valve seat 36, and the fluid displaced from the brake 45 returns to the chamber of the housing 1 to the right of the large piston 11 so that the parts are all repositioned for the braking operation already described.

While a certain representative embodiment and details have been shown for the purpose of illustrating the invention, it will be apparent to those skilled in this art that various changes and modifications may be made therein without departing from the spirit or scope of the invention.

What is claimed is:

1. In a hydraulic brake system a displacement saver including a first small diameter hydraulic cylinder having a piston, a second hydraulic cylinder having a piston about twice the area of the first piston, mechanical means interconnecting the first and second pistons, fluid supply means connected to the first hydraulic cylinder to move approximately twice as much fluid under half as much pressure out of the second cylinder, conduit means connected to the output of the second cylinder and adapted to connect to a brake, valve means associated with the output of the fluid from the second cylinder and normally open, piston means controlled by the pressure in the first cylinder for closing the valve means in the second cylinder output, a pressure bypass about said first and second pistons and said normally open valve means from the back side of the first piston to the conduit means, a spring-pressure-seated valve normally closing the bypass, and means for opening the spring-pressure-seated valve upon the closing of the normally open valve means to directly connect the fluid supply means through the bypass to the conduit means adapted to be connected to the brake.

2. A displacement saver for use with hydraulic brake systems and the like, including a housing, a two diameter piston slidably received in a two diameter bore in the housing, a pressure conduit connected to the housing to apply pressure at the small diameter end of the piston, the piston having a substantially axial bore therethrough, a control piston slidably received in the piston bore and having a piston rod extending in sealed relation through the large diameter end of the piston, the end of the large diameter bore of the housing having a discharge port in alignment with the piston rod, spring means holding the piston rod away from the port but yielding under the build up of pressure upon the control piston to move the piston rod to close the port, a pressure discharge conduit connected to the discharge side of the port, the housing having a bypass passage therethrough from the pressure conduit to the pressure discharge conduit, and a normally closed valve in the bypass passage and in alignment with the port so that movement of the piston rod to close the port opens the normally closed valve.

3. A displacement saver for use with hydraulic brake systems and the like, including a housing, a two diameter piston slidably received in a two diameter bore in the housing, a pressure conduit connected to the housing to apply pressure at the small diameter end of the piston, the piston having a substantially axial bore therethrough, a control piston slidably received in the piston bore and having a piston rod extending in sealed relation through the large diameter end of the piston, the end of the large diameter bore of the housing having a discharge port in alignment with the piston rod, spring means holding the piston rod away from the port but yielding under the build up of pressure upon the control piston to move the piston rod to close the port, a pressure discharge conduit connected to the discharge side of the port, the housing having a bypass passage therethrough from the pressure conduit to the pressure discharge conduit, a normally closed valve in the bypass passage, and means interconnecting the piston rod and the normally closed valve so that movement of the piston rod in the direction to close the port opens the normally closed valve.

4. A displacement saver for use with hydraulic brake systems and the like, including a housing having coaxial cylinder bores of different diameters, a two diameter tandem piston fitted in said bores for axial movement, said piston having a bore therethrough, a pressure conduit connected to said housing to apply pressure at the small diameter end of said piston, a control piston slidably received in the bore of the piston with one end exposed to pressure at the small end of said piston and having a piston rod extending through and beyond the large end of said piston, the larger of said cylinder bores having a discharge port in alignment with the piston rod, spring means holding the piston rod spaced from the discharge port but yieldable under the built-up pressure upon the control piston to move the piston rod to close the port, a pressure discharge conduit connected to the discharge side of the discharge port, the housing having a bypass connecting the pressure conduit to the pressure discharge conduit, and a normally closed valve in said bypass in alignment with the port so that movement of the piston rod to close the port opens the normally closed valve to open the bypass.

References Cited in the file of this patent

FOREIGN PATENTS 504,278  Great Britain _____ Apr. 19, 1939